US011750642B1

(12) United States Patent
Tautschnig et al.

(10) Patent No.: US 11,750,642 B1
(45) Date of Patent: *Sep. 5, 2023

(54) AUTOMATED THREAT MODELING USING MACHINE-READABLE THREAT MODELS

(71) Applicant: Amazon Technologies, Inc., Seattle, WA (US)

(72) Inventors: Michael Tautschnig, London (GB); Neha Rungta, San Jose, CA (US); John Cook, Brooklyn, NY (US); Pauline Virginie Bolignano, London (GB); Todd Granger MacDermid, Seattle, WA (US); Oksana Tkachuk, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,803

(22) Filed: Aug. 15, 2022

Related U.S. Application Data

(63) Continuation of application No. 16/842,496, filed on Apr. 7, 2020, now Pat. No. 11,418,532, which is a (Continued)

(51) Int. Cl.
*H04L 29/06* (2006.01)
*H04L 9/40* (2022.01)

(52) U.S. Cl.
CPC .......... *H04L 63/1433* (2013.01); *H04L 63/10* (2013.01); *H04L 63/1441* (2013.01); *H04L 63/20* (2013.01)

(58) Field of Classification Search
None
See application file for complete search history.

(56) References Cited

U.S. PATENT DOCUMENTS 8,429,751 B2 * 4/2013 Mizrahi ................ H04L 63/168
709/227
8,549,643 B1 * 10/2013 Shou ..................... G06F 21/556
455/410

(Continued)

OTHER PUBLICATIONS

Tague, Patrick et al. Evaluating the Vulnerability of Network Traffic Using Joint Security and Routing Analysis. IEEE Transactions on Dependable and Secure Computing, vol. 6, Issue: 2. https://ieeexplore.ieee.org/stamp/stamp.jsp?tp=&arnumber=4668352 (Year: 2009).*

(Continued)

*Primary Examiner* — Jeremiah L Avery
(74) *Attorney, Agent, or Firm* — Lee & Hayes, P.C.

(57) ABSTRACT

This disclosure describes techniques for automating a system-level security review of a network-based service. The techniques may include generating and utilizing a machine-readable threat model to identify system-level security threats to the network-based service. The network-based service may be scanned upon being provisioned in a service-provider network, and the machine-readable threat model may be generated based on results of the scan. The machine-readable threat model may represent components of the network-based service, system-level security constraints configured to identify system-level security threats to the service, and mitigations to remedy violations to the system-level security constraints. The network-based service may be continuously, or periodically, scanned to identify changes in the network-based service. The techniques further include updating the machine-readable threat model to account for the detected changes to the network-based service, and analyzing the updated machine-readable threat model to determine whether the changes to the network-based service violate a system-level security constraint.

20 Claims, 11 Drawing Sheets

Related U.S. Application Data continuation of application No. 15/907,870, filed on Feb. 28, 2018, now Pat. No. 10,652,266.

(56) References Cited

U.S. PATENT DOCUMENTS

| | | | | |
|---|---|---|---|---|
| 8,769,412 | B2* | 7/2014 | Gill | G06F 21/577 709/224 |
| 10,205,637 | B2* | 2/2019 | Porras | H04L 41/147 |
| 2011/0277034 | A1* | 11/2011 | Hanson | G06F 21/554 709/224 |
| 2014/0007241 | A1* | 1/2014 | Gula | H04L 63/1433 726/25 |
| 2014/0283083 | A1* | 9/2014 | Gula | H04L 63/1433 726/25 |
| 2015/0264077 | A1* | 9/2015 | Berger | G06F 21/51 726/23 |
| 2018/0084012 | A1* | 3/2018 | Joseph | H04L 63/108 |

OTHER PUBLICATIONS

Sher, Muhammad; Magedanz, Thomas. Mobile multimedia broadcasting vulnerability threats, attacks and security solutions. 2007 9th IFIP International Conference on Mobile Wireless Communications Networks. https://ieeexplore.ieee.org/stamp/stamp.jsp?tp=& arnumber=4668180 (Year: 2007).*

Sun, Yonglin et al. A new perspective of network vulnerability analysis using Network Security Gradient. 2011 International Conference for Internet Technology and Secured Transactions. https://ieeexplore.ieee.org/stamp/stamp.jsp?tp=&arnumber=6148373 (Year: 2011).*

Kbar, Ghassan. Security risk analysis for asset in relation to vulnerability, probability of threats and attacks. 2008 International Conference on Innovations in Information Technology. https://ieeexplore.ieee.org/stamp/stamp.jsp?tp=&arnumber=4781631 (Year: 2008).*

Ahmed, et al., Security Threat Assessment of Simultaneous Multiple Denial-of-Service Attacks in IEEE 802.22 Cognitive Radio Networks, retrieved at <<https://ieeexplore.ieee.org/stamp/stamp.jsp?=&arnumber=752351>>, 2016 IEEE 17th International Symposium on A World of Wireless, Mobile, and Multimedia Networks, 9 pages.

Chen, et al. "Quantative Threat Assessment of Denial of Service Attacks of Service Availability",retrieved at <<https://ieeexplore.ieee.org/stamp/stamp.jsp?tp=&arnumber=5953208>>, 2011 IEEE International Conference on Computer Science and Automation Engineering, pp. 220-224.

Cheikh Brahim Ould Mohamed El Moctar; Kanab§, Karim. A survey of security challenges in cloud computing. 2017 InternationalConference on Wireless Communications, Signal Processing and Networking (WiSPNET). https://ieeexplore.ieee.org/stamp/stamp.jsp?tp=&arnumber=8299880 (Year: 2017), 7 pages.

Office Action for U.S. Appl. No. 16/842,496, dated Dec. 24, 2021, Tautschnig, "Automated Threat Modeling Using Machine-Readable Threat Models", 6 pages.

Wang, et al."A Novel Threat, and Risk Assessment Mechanism for Security Controls in Service Management", retrieved at <<https://ieeexplore.ieee.org/stamp/stamp.jsp?tp=&arnumber6686285>> 2013 IEEE 10th International Conference on e-Business Engineering, 2013, pp. 337-344.

Wang, Peng-yu; Hong, Ming-quan. A Secure Management Scheme Designed in Cloud, 2016 IEEE 2nd International Conference on Big Data Security on Cloud (BigDataSecurity). https://ieeexplore.ieee.org/stamp/stamp.jsp?tp=&arnumber=7502282 (Year 2016), 5 pages.

* cited by examiner

AUTOMATED THREAT MODELING USING MACHINE-READABLE THREAT MODELS

RELATED APPLICATIONS

This application claims priority to and is a continuation of U.S. patent application Ser. No. 16/842,496, filed on Apr. 7, 2020, which claims priority to and is a continuation of U.S. patent application Ser. No. 15/907,870, filed on Feb. 28, 2018, the entire contents of which are incorporated herein by reference.

BACKGROUND

Service providers offer network-based services to fulfill user's computing-service needs without the users having to invest in and maintain computing infrastructure required to implement the services. For example, service providers may provide network-based computing resources and functionality to implement various types of services, such as scalable storage services, computer-processing services, speech-recognition services, payment-transaction services, and so forth. Often, these network-based services store and process sensitive or private information for the users, such as names of users, payment information of the users, etc. To prevent unauthorized, and potentially malicious, entities from obtaining the sensitive and private information, service providers employ service teams to manage security properties of the network-based services to identify and prevent security threats to the network-based services. For instance, service teams of security engineers identify security threats to the network-based services provided to users, and subsequently mitigate the security threats.

Users or developers of network-based services may be allowed or permitted to modify or otherwise make changes to the network-based services, such as modifying source code to change functionality of the services, add additional users to access-control policies to make the polices more permissible, and so forth. The amount of changes made, and the frequency at which the changes are made, to the network-based services make it more difficult to identify security threats that exist in the network-based services.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
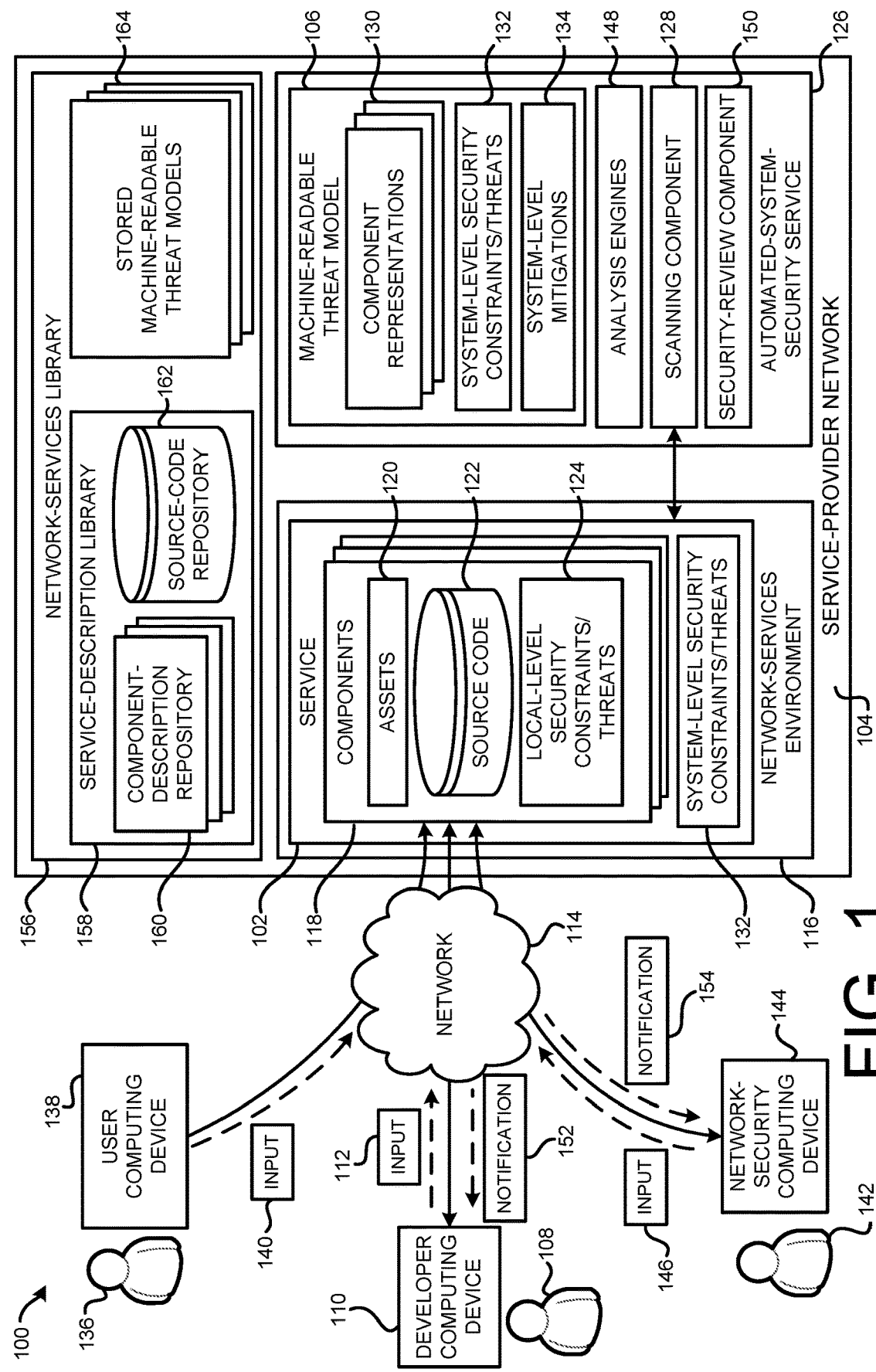
FIG. 1 illustrates a system-architecture diagram of an example environment in which a service provider provisions and manages a network-based service in a service-provider network, and continuously maintains a machine-readable threat model representing system-level security constraints to identify system-level security threats to the network-based service.

Service providers offer various network-based services to users to fulfill computing needs of users. These service providers may operate clusters of managed servers stored in data centers located across large geographic areas. In this way, users of the network-based services do not need to invest in and maintain the computing infrastructure required to implement the various services that they may need. Additionally, users are able to access, or provide to their clients, these network-based services over large geographic areas.

Service providers may offer various types of network-based services, such as application container solutions to run containerized applications in a cluster of manage servers, scalable storage services, relational database services, database tables and index management services, encryption key creation and management services, message queue services for safe messaging, notification services for publishing messages and mobile notifications to endpoint clients, and so forth. In some examples, these network-based services may be represented as components, or sub-services of larger network-based services with additional functionality. For instance, these sub-services may be combined as components of more complex network-based services having additional functionality, such as payment-processing services, online-gaming development services, machine-learning services, speech-processing services, and so forth.

Often, network-based services may receive, store, and/or process various types of sensitive or private data. For instance, a payment-processing service may receive and process customer-transaction data, such as credit card information, customer names, etc. Due to the sensitive and private information often stored and processed by the network-based services, the service providers may employ service teams to manage security properties of the network-based services to identify and prevent security threats to the network-based services. For instance, service teams of security engineers may work to identify security threats to the network-based service provided to users, and subsequently mitigate the security threats.

Security engineers often create threat models for a network-based service by describing threats to the network-based service using drawings on whiteboards, wiki pages, and/or other text-based natural-language documents. However, these descriptions may involve manual updating, are cumbersome to use, and often become outdated. For instance, the network-based services may be complex services which are difficult to monitor for security threats by teams of security engineers. Further, the network-based services may be subject to modifications from developers or users of the network-based services, which may expose provisioned network-based services to threats. In light of the complexity of the network-based services, as well as the amount of changes and/or frequency at which changes are made to the network-based services, threat models representing threats (or potential threats) to a network-based service that are described in text-based, natural-language documents become outdated and inaccurate. Accordingly, network-based services are often left exposed to security threats from unauthorized entities, such as side-channel attacks, memory attacks, cross-site scripting (XXS) attacks, SQL injection attacks, and so forth.

This disclosure describes techniques for automating a continuous, system-level security review of a network-based service. The techniques may be performed by an automated, system-security service that utilizes machine-readable threat models to identify system-level security threats to network-based services. In some examples, the machine-readable threat models are automatically generated and maintained by scanning the various components of network-based services, and utilized to automate detection of violations of system-level security constraints or properties. Upon detecting a violation of a system-level security constraint, the system-security service may perform various operations, such as notifying a security engineer of the violation, providing an indication of a mitigation to resolve the system-level security threat, and/or automatically mitigating the system-level security threat.

In some examples, a user or client of the service provider may send a request to the service provider to provision a network-based service for the user. The request, which may also include follow-up communications, may include a design for their network-based service, including specifications regarding service architecture, service functionality, etc. The service provider may provision the requested network-based service in a service-provider network of managed servers in datacenters. Generally, a network-based service may include assets, or the components/sub-services of the network-based service, and source code for implementing the functionality of the network-based service.

Upon provisioning the requested network-based service, the system-security service may automatically begin scanning the provisioned components, such as the assets (e.g., hardware-based resources, virtual machine instances, applications, servers, APIs, etc.) and source code of the components, to determine what has been deployed for the network-based service in the service-provider network. In addition to identifying what has been deployed for the network-based service, the system-security service may further identify the flow of data between the various components, as well as component-level (or "local-level") security constraints for the various components. Upon determining the components which make up the network-based service, the system-security service may identify component-level security constraints for the components of the network-based service.

As described herein, local-level security constraints may be security constraints for components that make up the network-based service. For instance, a local-level security constraint may comprise an access-policy for a database that stores data used by the network-based service. System-level security constraints may be security constraints for the entire network-based security service, which may be defined by a boundary. For instance, a system-level security constraint may generally define security parameters for a boundary of the network-based service where data is received from a user device, and output to a user device (or a "user-boundary"). System-level security constraints may govern the storage, processing, and communication of data performed internal to the user-boundary where users input data, and the service outputs data to a user. Stated another way, the system-level security constraints may govern security for boundaries between users and a service, where the boundary generally represents observable behavior to the user. Thus, system-level security constraints may govern security for boundaries defined as being user-observable behavioral boundaries of the service, and local-level security constraints may generally govern security for internal behavior of the service that is not observable by a user of the service.

Generally, the components (or "sub-services") which make up the network-based services (or "system-level services") may each be associated with respective component-level security constraints or policies (or "local-level security constraints"). For instance, a component included in a system-level, network-based service may simply be a storage database that stores information. In such examples, the storage database component may store private information, such as customer payment information, and have associated local-level security constraints. As a specific example, the storage database may have an access-control policy that defines what functions or clients are able to access information stored in the database.

Thus, the types of components, and connections between the components, may be determined upon analyzing or scanning the provisioned network-based service. The types of components, local-level security constraints, connections between the components, flow of data into and out of the network-based service, and potentially other source of information, may be identified by scanning the network-based service, and utilized to generate a machine-readable threat model for the network-based service.

The machine-readable threat model for the network-based service may be generated in various machine-readable or machine-parsible formats or templates, such as JavaScript Object Notion (JSON) format, eXtensible Markup Language (XML), or any other machine-readable language with formally defined syntax and semantics to specify the threat model of the network-based service. The machine-readable threat model may represent components of the service, boundaries or edges between the components, external dependencies of the service, potential system-level and/or local-level threats to the service, and mitigations for the threats.

As noted above, once the machine-readable threat model has been generated, the system-security service may continuously or periodically scan the network-based service. During or after scanning the network-based service, the system-security service may identify or detect changes in the network-based service. For instance, the system-security service may determine that a user has modified an access-control policy for a component of the network-based service. In order to maintain a machine-readable threat model that accurately represents components of the network-based service, security constraints, security threats, and mitigations, the system-security service may update the machine-readable threat model to reflect the change detected in the network-based service. In this way, a continuously or periodically updated machine-readable threat model may be utilized by the system-security service to determine whether changes in the network-based service violated a security constraint and exposed the network-based service to system-level security threats. For instance, the system-security service may determine whether the modification of the access-control policy for the component of the network-based service violate a system-level security constraint and expose the network-based service to a system-level security threat.

Accordingly, the system-security service may utilize the machine-readable threat model to identify or detect threats to the network-based service. For example, the system-security service may continuously, periodically, or upon detecting an event (e.g., a change in the network-based service) scan the network-based service. Based on scanning the network-based service, the system-security service may utilize the machine-readable threat model to determine whether system-level security constraints have been violated in the network-based service, thereby leaving the network-based service vulnerable to system-level security threats. For instance, the system-security service may determine that a violation of a system-level security constraint has occurred in the network-based service due to a change in the network-based service. As a specific example, the system-security service may determine that sensitive data may be "leaking" from a storage database and is able to escape a system-level security boundary of the network-based service such that an unauthorized user is able to obtain private data from the network-based service in violation of a system-level security constraint.

Upon detecting the violation of the system-level security constraint, the system-security service may perform various operations. The system-security service may send a notification to a security device of a security engineer to notify the security engineer of the violation of the system-level security constraint. Further, the system-security service may provide an indication of a mitigation, stored in the machine-readable threat model, to remedy the detected system-level security threat to which the network-based service is exposed. In some examples, the system-security service may automatically perform the mitigation that is indicated by the machine-readable threat model as remedying the system-level security threat.

Accordingly, the techniques described herein may enable a system-security service to generate a machine-readable threat model throughout a lifecycle of a network-based service. The machine-readable threat model may be readable or parsible by processors of the system-security service, and represent components of the network-based service, system-level security constraints of the network-based service, system-level security threats to the network-based service, and mitigations for resolving the system-level security threats to the network-based service. Further, the system-security service may maintain a more accurate representation of the network-based service by continuously, or periodically, scanning the network-based service to identify changes in the service, update the machine-readable threat model may to represent the changes in the service, and determine whether the changes in the service violate the system-level security constraints.

The techniques described herein affect and improve the operations of computing devices in various ways. Previously, network-based service providers were unable to perform automated threat detection for network-based services. Instead, security engineers attempted to create whiteboard drawings and text-based, natural-language descriptions of system-level security constraints and threats for a network-based service. However, due to the complexity of these services and the amount of changes and frequency of changes made to the network-based services, security engineers were unable to maintain an accurate representation of network-based services using human crafted and understandable threat models. Thus, network-based services often were subjected to security threats that were not detected by security engineers, thereby degrading the security of data utilized by network-based services. However, the techniques described herein utilize a specific set of rules that enable computing devices to perform tasks that were previously unperformable by computing devices. For instance, the techniques described herein solve a problem rooted in technology (e.g., network-based services being exposed to security threats), utilizing a solution rooted in technology (e.g., generating machine-readable threat models to detect security threats). Further, the techniques described herein improve upon previously performed techniques. For instance, by utilizing machine-readable threat models, representations of network-based services are able to be continuously, or periodically, updated upon scanning the network-based services to represent changes in the network-based services. In this way, changes that violate security constraints of the network-based service represented in the machine-readable threat models are identified in the updated threat models, and may be remedied, thereby improving the security of network-based services.

Although the techniques described herein are primarily with respect to network-based services, the techniques are equally applicable to local services that are stored local to user devices. Additionally, the techniques described in this disclosure may be primarily with respect to specific types of services, but the techniques described are equally applicable to any type of service for which a machine-readable threat model may be generated. Further, while the techniques are described with respect to various system architectures, various and differing types of system architectures may be utilized to perform the techniques.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider provisions and manages a network-based service 102 in a service-provider network 104, and maintains a machine-readable threat model 106 representing system-level security constraints used to identify system-level security threats to the network-based service 102.

In some examples, a developer 108 may utilize a developer computing device 110 to provide input 112, via a wired and/or wireless network 114, to the service-provider network 104. In some examples, the input 112 may comprise a request to provision the network-based service 102. The input 112 may further include one or more communications or messages that include a design for the requested network-based service 112, including specifications regarding service architecture, service functionality, etc. The service provider may provision the requested network-based service 102 in a network-based services environment 116 of the service-provider network 104, where the network-services environment 116 may comprise managed servers in datacenters of the service-provider network 104.

Based on the input 112 comprising the request for provisioning of the network-based service 102, the service provider may provision the service 102, where the service 102 includes multiple components 118, and each of the components 118 comprise one or more assets 120 (e.g., hardware-based resources, virtual machine instances, applications, servers, APIs, etc.), source code 122 for implementing functionality of the component 118, local-level security constraints/threats 124, and potentially other hardware-based and/or software based components (e.g., network configuration data, mitigations for threats, etc.).

The components 118 may comprise any type of component or sub-service that serves as a building block for the network-based service 102, such as application container solutions to run containerized applications in a cluster of manage servers, scalable storage services, relational database services, database tables and index management services, encryption key creation and management services, message queue services for safe messaging, notification services for publishing messages and mobile notifications to endpoint clients, and so forth.

Upon provisioning the network-based service 102 in the network-services environment 116, an automated-system-security service 126 may perform various operations for generating the machine-readable threat model 106. For instance, a scanning component 128 of the automated-system-security service 126 may scan or analyze the network-based service 102, such as the assets 120, source code 122, local-level security constraints/threats 124, etc., in order to determine what has been deployed in the network-services environment 116 for the network-based service 102. In addition to identifying what has been deployed for the network-based service 102, the automated-system-security service 126 may further identify flows of data between the various components 118. Upon determining the components 118 that make up the network-based service 102, the automated-system-security service 126 may identify local-level security constraints 124 for the components 118 of the network-based service 102. For example, the scanning component 128 may derive the local-level security constraints/threats 124 and mitigations from a knowledge-base that stores constraints, threats, and mitigations for specific components 118 utilized by the service-provider network. A local-level security constraint 124 may be a security constraint that is specific to a component 118 of the network-based service 102. For instance, a local-level security constraint 124 may comprise an access-policy for a storage database that stores data used by the network-based service 102. Based on the types of components 118, connections between the components 118, the assets 120 for the components 118, the source code 122 for the components 118, the local-level security constraints/threats 124, and/or other data, the automated-system-security service 126 may generate the machine-readable threat model 106. The machine-readable threat model 106 may comprise any type of machine-readable or parsible representation (e.g., JSON, XML, (XML), or any other machine-readable language with formally defined syntax and semantics to specify the threat model). The machine-readable threat model 106 may represent or include component representations 130 for the components 118, system-level security constraints and threats 132, and system-level mitigations 134 for resolving the system-level security threats 134. Thus, the machine-readable threat model 106 may specify assets 120 of the service 102 through machine-readable templates, specify networks, resources allocated in the service 102, edges between the various components 118, and/or other external dependencies of the network-based service 102. In some examples, the machine-readable threat model 106 may be generated or created during a design phase of the network-based service 102, or after the network-based service 102 has been provisioned (e.g., after scanning or analyzing the network-based service 102 after being provisioned in the network-services environment 116). In some examples, the system-level security constraints/threats 132 in the machine-readable threat model 106 may comprise representations of system-level security constraints/threats 132 of the service 102. For instance, the system-level security constraints/threats 132 of the service 102 may be characteristics or attributes of the service 102, and the system-level security constraints/threats 132 of the machine-readable threat model 106 may be representations of the attributes of the service 102.

In some examples, the machine-readable threat model 106 may be generated as a hierarchal description of the components 118 of the service 102. The machine-readable threat model 106 may further represent what mechanisms connect the components 118 together, and what level of security those connections have (e.g., HTTPS, an encrypted channel, local host, etc.). To generate the machine-readable threat model 106, the scanning component 128 may utilize various services which track data flows between components 118 or micro-services. Further, the scanning component 128 may hook directly into a data plane of a service 102 to determine how data is flowing between components 118. The scanning component 128 may analyze data flow logs, cloud-trail data, data planes, accesses, etc., to help generate the machine-readable threat model 106 representing the service 102. At the source-code level for the source code 122, the scanning component 128 may automatically generate interfaces from descriptions for the service 102 to generate the machine-readable threat model 106.

After generating the machine-readable threat model 106, the scanning component 128 may be configured to further scan or analyze the network-based service 102 to determine whether the system-level security constraints 132 have been violated. For example, the developer computing device 110 may have provided input 112 that modified the assets 120, source code 122, local-level security constraints 124, or other portions of the components 118. The scanning component 128 may continuously, or periodically, analyze the network-based service 102 to identify such changes or modifications to the service 102. In some examples, a user 136 of a user computing device 138 may provide input 140, via the network 114, to the service-provider network 104 in an attempt to modify the network-based service 102. In some examples, the user 136 may be an unauthorized user 136 attempting to provide input 140 to modify the network-based service 102 in order to perform malicious activities. For instance, the unauthorized user 136 may provide input 140 to modify a local-level security constraint 124, such as modifying an access-control policy, to obtain sensitive information used by the service 102. In further examples, a network-security engineer 142 may utilize a network-security computing device 144 to provide input 146 to modify components 118 of the service 102, such as providing updates to the service 102 (e.g., versioning updates, software updates, etc.). However, the input 146 to modify the components 118 of the service may change the service 102 in such a way as to violate a system-level security constraint 132, which may be unintentional.

In some examples, the scanning component 128 may comprise a network scanning component 128 which utilizes host classes or account IDs associated with the service 102. For instance, the scanning component 128 may trigger an activity that enumerates all components 118 and/or services 102 for an account, obtains their IP addressed, and perform a network scan of the components 118. Thus, the scanning component 128 may perform a network-based scan for the components 118 or other entities in the service 102 by utilizing IP addresses for the components 118 (e.g., resources, instances, etc.).

In various examples, the scanning component 128 may perform an agent-based analysis by deploying an agent onto a host that makes up the service 102. In even further examples, the scanning component 128 may detect ports "listening" that should not be by analyzing VTC flow logs being consumed and validating traffic as it is flowing to these ports. If there is traffic detected at ports where there should not be, then an entity is at those ports consuming data.

The scanning component 128 may identify changes to the network-based service 102 and modify the machine-readable threat model 106 based on the changes to generate an updated machine-readable threat model 106. For instance, the scanning component 128 may update the component representations 130 based on the change. In this way, the machine-readable threat model 106 may be maintained as a more accurate representation of the network-based service 102.

In various examples, the automated-system-security service 126 may store and utilize various analysis engines 148 to check the consistency of the machine-readable threat model 106 with the deployed assets 120, source code 122, etc., of the components 118 of the network-based service 102. Further, the analysis engines 148 may detect violations of the system-level security constraints 132 by analyzing the updated component representations 130. For example, changes to the network-based service 102 may cause a system-level security constraint 132 to be violated such that a system-level security threat 132 is exposed in the network-based service 102. Examples of such violations of the system-level security constraints 132 may include detection of security vulnerabilities such as establishing memory safety of source code 122 (e.g., C/C++), finding uncaught exceptions source code 122 (e.g., in Java and C++), and/or proving that assertions do not fail in the source code 122 (e.g., C/C++/Java). In some examples, the analysis engines 148 may identify program locations in the source code 122 that lead to cross-site scripting (XSS) and SQL-injection threats 132 are detected by constraint-based dynamic analysis engines, as cases where private data (e.g., passwords) are logged or sent as URL-parameters in web-based applications. The analysis engines 148 may also contain custom checks to ensure best practices for source code 122 are being followed, such as proper authentication, authorization, and encryption, as well as proper sanitization of inputs and outputs to avoid attacks such as XSS and SQL injection. The analysis engines 148 may be updated, removed, added, or receive extensions as developments in the analysis engines 148 occur (e.g., development of new analysis engines 148).

If the analysis engines 148 determine that a system-level security constraint 132 has been violated, a security-review component 150 may identify the various threats 132 that apply to the network-based service 102, and manage the security review of the service 102. In some examples, the security-review component 150 may provide a notification 152 to the developer computing device 110 that a system-level security constraint 132 was violated and the network-based service 102 is exposed to a corresponding system-level security threat 132. Further, the security-review component 150 may provide a notification 154 to the network-security computing device 144 that the system-level security constraint 132 was violated and the network-based service 102 is exposed to a system-level security threat 132. Further, in some examples the security-review component 150 may also provide, to at least one of the developer computing device 110 or the network-security computing device 144, an indication of a system-level mitigation 134 to be taken to remedy the system-level security threat 132 caused by violation of the system-level security constraint 132. In even further examples, the security-review component 150 may automatically perform the system-level mitigation 134 to remedy the system-level security threat 132, such as by changing an access-control policy of a component 118 of the network-based service 102. In this way, the automated-system-security service 126 may automate generating and maintaining of a machine-readable threat model 106 that represents a network-based service 102, and may utilize the machine-readable threat model 106 to detect violations of system-level security constraints 132 for the network-based service 102.

In some examples, the service-provider network 104 may include a network-services library 156 that stores various types of service data. For example, the network-services library 156 may store a service-description library 158 that includes a component-description repository 160 to store descriptions of network-based services 102 provided by the service provider, and a source-code repository 162 that stores source code 122 for corresponding component descriptions stored in the component-description repository 160. In this way, the service-provider network 104 may provision network-based services 102 for developers 108 more quickly by recycling commonly used components 118 that are stored in the component-description repository 160, and corresponding source code 122 stored in the source-code repository 162. Similarly, the network-services library 156 may further include stored machine-readable threat models 164 corresponding to components 118 whose descriptions are stored in the component-description repository 160, and source code 122 is stored in the source-code repository 162. In this way, a requested network-based service 102 may be provisioned more quickly using data stored in the service-description library 158, and rather than having to regenerate a machine-readable threat model 106 each time a service 102 is provisioned, a machine-readable threat model 106 may be identified from or selected from the stored machine-readable threat models 164 for associated components 118 for a service 102. In this way, the machine-readable threat models 106 may be reused or recycled for future services 102 that have already had machine-readable threat models 106 generated for them for previous developers 108.

Figure 2:
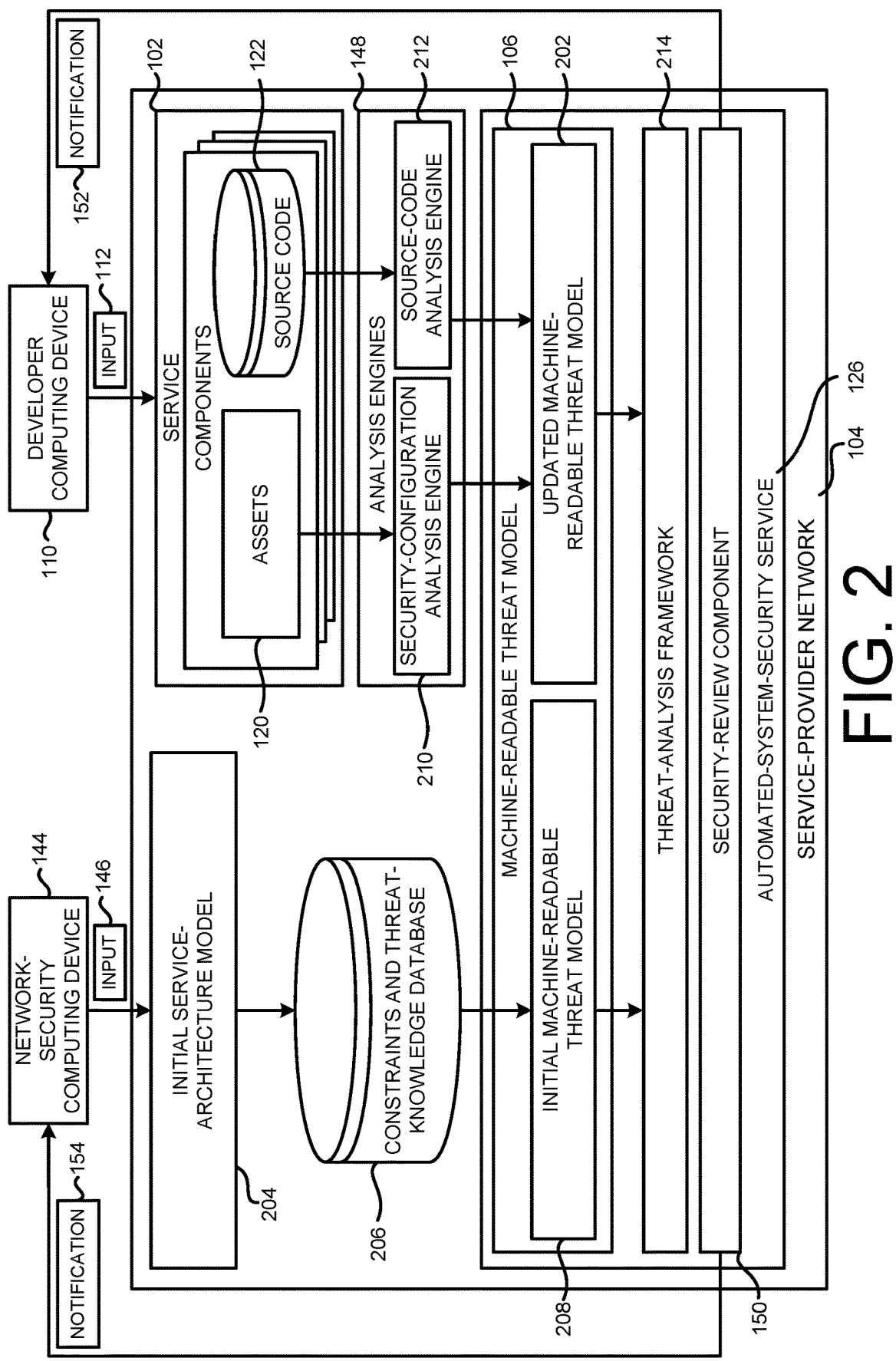
FIG. 2 illustrates a system-architecture diagram of an example automated-system-security service that maintains an updated machine-readable threat model representing system-level security constraints of a network-based service, and utilizes the updated machine-readable threat model to identify system-level threats to the network-based service.

FIG. 2 illustrates a system-architecture diagram of an example automated-system-security service 126 that maintains an updated machine-readable threat model 202 representing system-level security constraints 132 of a network-based service 102, and utilizes the updated machine-readable threat model 202 to identify system-level threats 132 to the network-based service 102.

In some examples, a network-security engineer 142 may utilize the network-security computing device 144 to provide input 146 to the automated-system-security service 126. For instance, the network-security engineer 142 may design, generate, or otherwise provide an initial service-architecture model 204 to the automated-system-security service 126. In some examples, however, the initial service-architecture model 204 may be generated by the automated-system-security service 126 by scanning the network-based service 102 upon provisioning the network-based service 102 in the service-provider network 104.

In some examples, the initial service-architecture model 204 may be created based on assumptions included in an initial design for the network-based service 102. The initial service-architecture model 204 may represent the architecture, based on assumptions, of the network-based service 102 prior to provisioning of the network-based service 102 in the service-provider network 104. In various examples, the automated-system-security service 126 may further store or include a constraints and threat-knowledge database 206. In some examples, the constraints and threat-knowledge database 206 may include commonly used constraints for a network-based service 102. For instance, over time commonly used constraints may be added to the constraints and threat-knowledge database 206, and based on the components 118 and connections of the initial service-architecture model 204, certain constraints may automatically be added to the constraints and threat-knowledge database 206. In some examples, an option to edit the set of constraints, such as adding new constraints or deleting constraints, may be utilized to modify constraints for the initial service-architecture model 204. Further, the constraints and threat-knowledge database 206 may store threats and recommended mitigations associated with the stored constraints.

The automated-system-security service 126 may utilize the initial service-architecture model 204 and the constraints and threat-knowledge database 206 to generate an initial machine-readable threat model 208 with assumptions. The initial machine-readable threat model 208 may include assumptions about the initial service-architecture model 204, such as components 118 that are to be implemented in an initial design of the service 102, and constraints that are assumed to have been implemented in the initial design of the service 102. The use of the initial machine-readable threat model 208 with assumptions will be described below with reference to FIG. 2.

In some examples, the analysis engines 148 may include a security-configuration analysis engine 210, and a source-code analysis engine 212. The security-configuration analysis engine 210 may check security configurations of the assets 120, and continuous analysis results from the security-configuration analysis engine 210 may be mapped onto the updated machine-readable threat model 202 to update the model 202. For instance, the security-configuration analysis engine 210 may continuously, or periodically, scan the assets 120 to check for a variety of service and resource configurations to determine whether constraints of the updated machine-readable threat model 202 have been violated. The security-configuration analysis engine 210 may comprise a constraint-based network and policy analysis tool to automatically check the constraints included in the updated machine-readable threat model 202 of the machine-readable threat model 106.

The source-code analysis engine 212 may analyze the source code 122 to determine whether constraints of the updated machine-readable threat model 202 have been violated. For instance, the source-code analysis engine 212 may detect program locations in the source code 122 that lead to cross-site scripting (XSS) and SQL-injection vulnerabilities are using constraint-based dynamic analysis engines. Further, the source-code analysis engine 212 may determine whether private data (e.g., passwords) are logged or sent as URL-parameters in web-based applications. Even further, the source-code analysis engine 212 may include custom checks to ensure source code 122 best practices are being followed, such as proper authentication, authorization, and encryption, as well as proper sanitization of inputs and outputs to avoid attacks such as XSS and SQL injection. The source-code analysis engine 212 may comprise a static analysis framework, and may be a continuous as well as demand-driver source code 122 analysis framework. The source-code analysis engine 212 may utilize constraint-based static and dynamic program-analysis tools to update the updated machine-readable threat model 202 based on changes detected in the source code 122.

Thus, the security-configuration analysis engine 210 may update the updated machine-readable threat model 202 based on changes detected in the assets 120, and the source-code analysis engine 212 may update the updated machine-readable threat model 202 based on changes detected in the source code 122.

The automated-system-security service 126 may further include a threat-analysis framework 214 configured to analyze the updated machine-readable threat model 202 and/or the initial machine-readable threat model 208 to determine whether changes to the components 118 violate a system-level security constraint 132. The threat-analysis framework 214 may be configured to reason about system-level security constraints 132 of the machine-readable threat model 106 and provide security guarantees for the network-based service 102 using the machine-readable threat model 106. For instance, the threat-analysis framework 214 may utilize constraint-based network and policy analysis tools to automatically check the security constraints 132 in the updated machine-readable threat model 202. In this way, the threat-analysis framework 214 may determine, for example, if the updated machine-readable threat model 202 is consistent, or sound, with respect to current policies and network configurations of the network-based service 102. For instance, the threat-analysis framework 214 may ensure that roles shared between different components 118 are unique and each component 118 can be identified from a role in order to guarantee separation or privilege, that websites and web-based APIs of the service 102 have HTTPs enabled, that the service 102 follows default security tenants when creating elastic computing resources, etc. In some examples, the threat-analysis framework 214 may determine whether threat mitigations 134 included in the updated machine-readable threat model 202 still hold during deployment of the network-based service 102.

In further examples, the threat-analysis framework 214 may further analyze the updated machine-readable threat model 202 based on updates in the source code 122 received from the source-code analysis engine 212. For example, the threat-analysis framework 214 may determine whether the updated machine-readable threat model 202 is consistent with respect to current source-code 122 of the service 102. Examples may include checking whether new libraries have been added to the source code 122, unspecified communication channels between components 118 are implemented, etc. Further, the threat-analysis framework 214 may determine whether the threat mitigations 134 included in the updated machine-readable threat model 202 are implemented by the service 102. In some examples, the threat-analysis framework 214 may check that encryption and signing are used on customer data or other private data, ensuring that database queries are appropriately sanitized, and authentication mechanisms are correctly implemented.

In some examples, the threat-analysis framework 214 may further determine whether the results of the analysis of the updated machine-readable threat model 202 are consistent with the assumptions of the initial machine-readable threat model 208. The threat-analysis framework 214 may provide the results of the analysis of the update machine-readable threat model 202 to the security-review component 150.

The security-review component 150 may maintain and manage the state of the security review for the network-based service 102. For instance, the security-review component 150 may determine whether a network-security engineer 142 has reviewed the network-based service 102. The security-review component 150 may determine what constraints of the updated machine-readable threat model 202 are being violated by the network-based service 102 based on results received from the threat-analysis framework 214. The security-review component 150 may determine what source code 122 and assets 120 are included in the network-based service 102 based on results received from the threat-analysis framework 214.

In some examples, the security-review component 150 may provide a notification 154 to the network-security computing device 144 of a violation of a system-level security constraint 132, and may additionally provide an indication of a system-level mitigation 134 to remedy the corresponding system-level security threat 132. In other examples, the security-review component 150 may automatically implement an appropriate system-level mitigation 134 to remedy the system-level security threat 132 that violates the corresponding system-level security constraint 132. In some examples, the security-review component 150 may determine whether the gaps or violations of the system-level security constraints 132 have been appropriately mitigated.

Figure 3A:
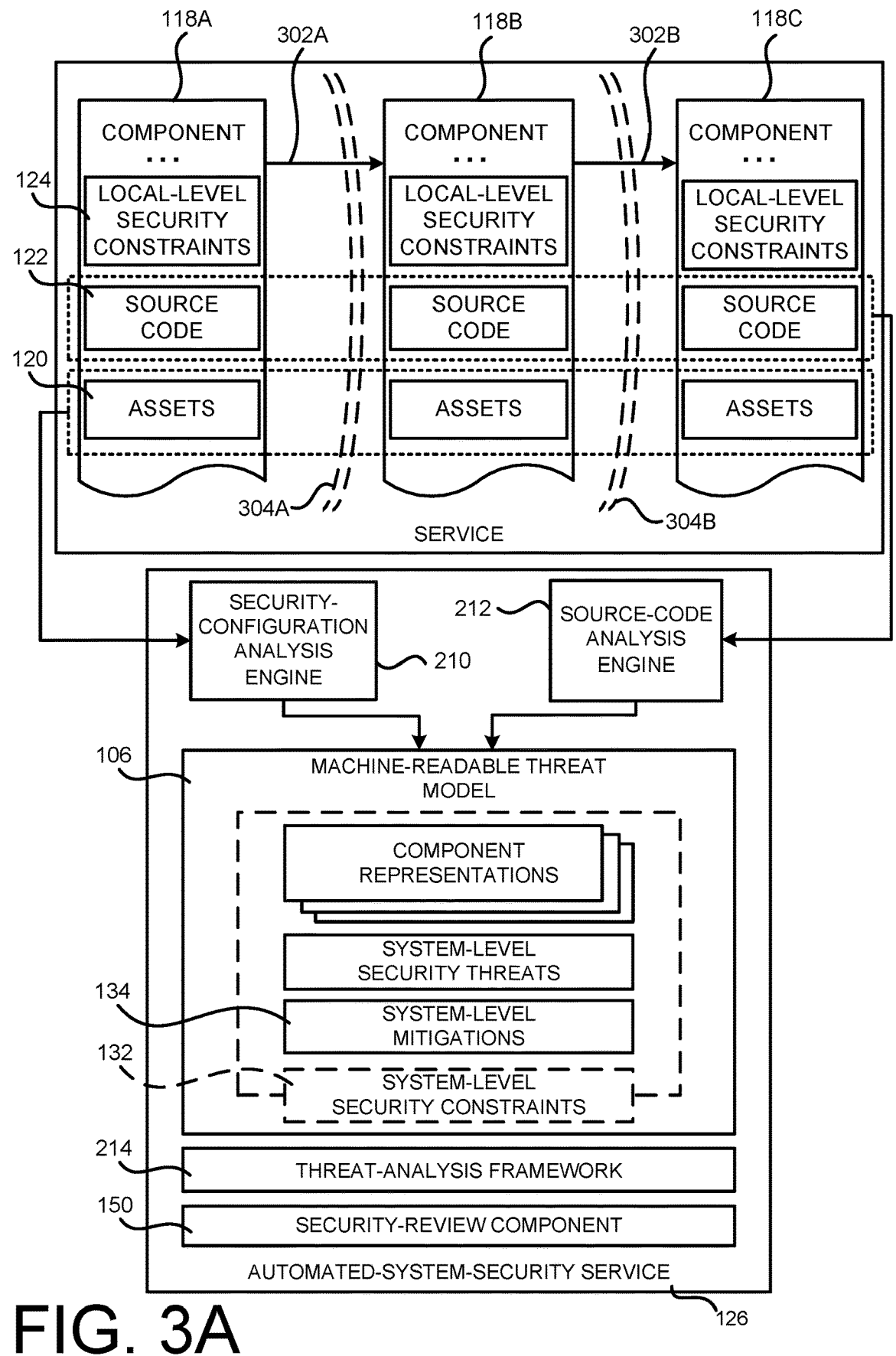
FIG. 3A illustrates a system-architecture diagram of an example automated-system-security service that detects changes in components of a network-based service, updates a machine-readable threat model representing the network-based service, and identifies system-level threats to the network-based service utilizing system-level constraints represented in the machine-readable threat model.

FIG. 3A illustrates a system-architecture diagram of an example automated-system-security service 126 that detects changes in components 118 of a network-based service 102, updates a machine-readable threat model 106 representing the network-based service 102, and identifies system-level threats 132 to the network-based service 102 utilizing corresponding system-level constraints 132 represented in the machine-readable threat model 106.

As shown in FIG. 3A, the network-based service 102 may have data flows 302A and 302B between components 118A, 118B, and 118C of the service 102. The data flow 302A indicates that data is flowing from component 118A to component 118, and the data flow 302B indicates that data is flowing from component 118B to 118C. For example, component 118A may comprise a network-based API that receives transaction data (e.g., credit card data) from a user computing device 138. The network-based API 118A may then send the data to component 118B, which may comprise secure-storage database to store the transaction data. The data flow 302B indicates that the transaction data flows from the secure-storage database to component 118C, which may comprise a transaction-processing application. The transaction-processing component 118C may then process the transaction data to complete a purchase between the user 136 and the developer 108.

As further illustrated, the service 102 may include a security boundary 304A between component 118A and component 118B, and a security boundary 304B between component 118B and component 118C. The security boundaries 304A and 304B may represent a condition, such as a local-level security constraint 124 or a set of constraints 124, under which the security boundaries 304A and 304B along the edge between the components 118 holds. For instance, the security boundaries 304A may comprise restraints that no other entry point to component 118B is to exist, data flowing 302A into the component 118B must be authenticated, the data flow 302A may be encrypted using a specific encryption key, etc. In this way, the security boundary 302A may prevent unauthorized data, clients, functions, etc., from passing data into component 118B. Similarly, the boundary 304B may indicate similar types of constraints. For instance, the boundary 304B may comprise a restraint that no other entry point to component 118B is to exist, the data flow 302B may be encrypted using a specific encryption key, etc.

In some examples, the developer computing device 110, user computing device 138, and/or network-security computing device 144 may modify constraints included in one or both of the boundaries 304A and 304B. In such examples, the security-configuration analysis engine 210 may detect the change in the boundaries 304A or 304B, and update the machine-readable threat model 106 to indicate that constraints of at least one of the boundaries 304A or 304B have been modified, such as becoming more permissible.

The threat-analysis component 214 may then determine whether a system-level security constrain 132 has been violated based on the change to the machine-readable threat model 106. In some examples, the change to the boundary 304A and/or 304B may violate a system-level security constrain 134 for the service 102. For instance, if the boundary 304A was modified to become more permissible, the change to the local-level security constraint 124 of the boundary 304A may provide a network path from the component 118B to a point outside the system-level security constraints 132 such that an unauthorized user may bypass the boundary 304A and access sensitive data stored in the component 118B. in such examples, the system-level security constraint 132 may be violated, and a corresponding system-level threat 132 may be identified by the threat-analysis framework 214. The threat-analysis framework 214 may then pass the results of the analysis to the security-review component 150. Alternatively, if the boundary 304A was modified to become more permissible, the change to the local-level security constraint 124 of the boundary 304A may not violate a system-level security constraint 132 because sensitive data stored in the component 118B may still be protected within the boundaries of the network-based service 102 at a system-level.

System-level security constraints 132 may be security constraints for the network-based security service 102 as a whole, which may be defined by a boundary. For instance, a system-level security constraint 132 may generally define security parameters for a boundary of the network-based service 102 at which data is received from a user device, and output to a user device. System-level security constraints 132 may govern the storage, processing, and communication of data performed internal to the user-boundary where users input data, and the service outputs data to a user.

Figure 3B:
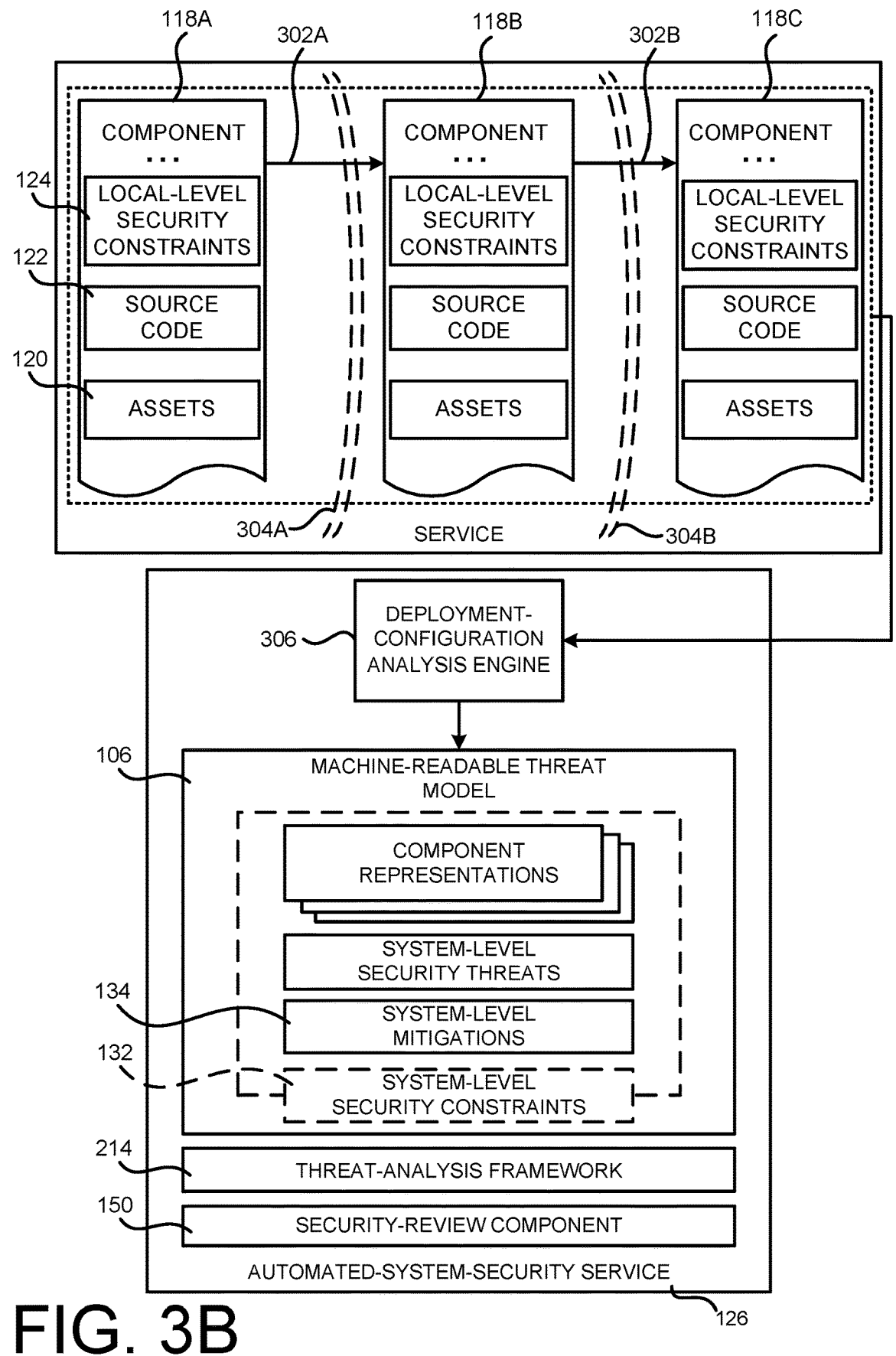
FIG. 3B illustrates another system-architecture diagram of an example automated-system-security service that detects changes in components of a network-based service, updates a machine-readable threat model representing the network-based service, and identifies system-level threats to the network-based service utilizing system-level constraints represented in the machine-readable threat model.

FIG. 3B illustrates another system-architecture diagram of an example automated-system-security service 126 that detects changes in components 118 of a network-based service 102, updates a machine-readable threat model 106 representing the network-based service 102, and identifies system-level threats 132 to the network-based service 102 utilizing corresponding system-level constraints 132 represented in the machine-readable threat model 106.

Similar to FIG. 3A, the network-based service 102 may have data flows 302A and 302B between components 118A, 118B, and 118C of the service 102. The data flow 302A indicates that data is flowing from component 118A to component 118, and the data flow 302B indicates that data is flowing from component 118B to 118C.

However, unlike FIG. 3A, the automated-system security service may include a deployment-configuration analysis engine which may analyze the service description of the service 102. For instance, the overall system configuration of the service 102 may be rolled into a whole, system-level configuration. For instance, not only the source code 122 of the individual components and the assets of the individual components 120, but also how they work together is described as a deployment-configuration. The system-level deployment-configuration may describe the entirety of the components 118, what hosts they are deployed on, etc. The deployment-configuration analysis engine 306 may be utilized to analyze the security policies of the deployment-configuration of the service 102 as a whole, rather than looking at individual assets 120, source code 122, etc. The deployment-configuration analysis engine 306 may detect changes in the deployment-configuration of the service 102, and update the machine-readable threat model 106 to indicate that local-level constraints have been violated.

It is contemplated that the deployment-configuration analysis engine 306 may be used in addition to, or as an alternative to, the security-configuration analysis engine 210 and the source-code analysis engine 212. However, in various examples, any of the security-configuration analysis engine 210, the source-code analysis engine 212, and the deployment configuration analysis engine 306 may be used individually, or in any combination, to update the machine-readable threat model 106 based on changes to the service 102, and analyze the updated machine-readable threat model 106 to detect violations of system-level security constraints 132.

Figure 4:
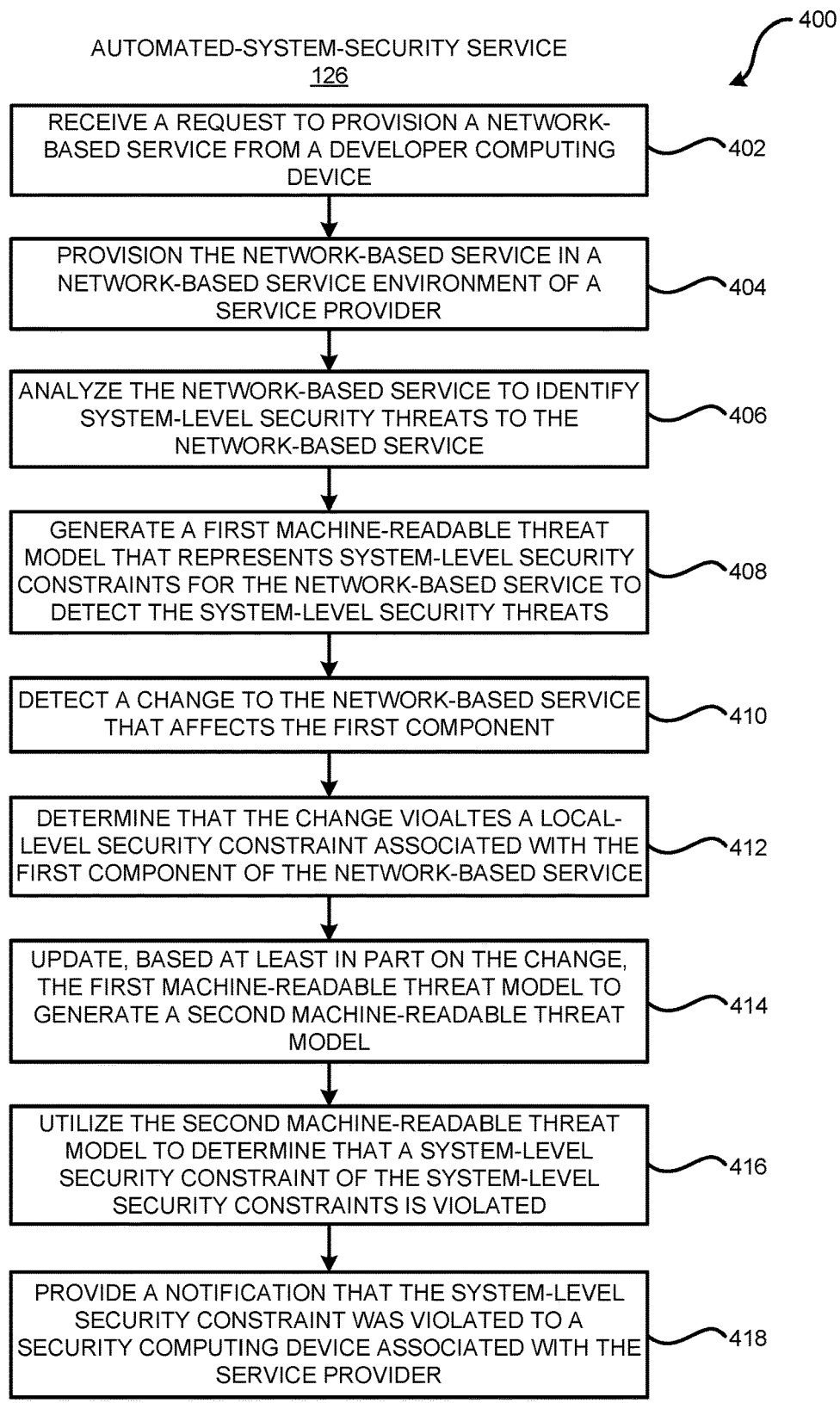
FIG. 4 illustrates a flow diagram of an example method, performed at least partly by an automated-system-security service, for utilizing a machine-readable threat model to identify system-level security threats to a network-based service caused by changes in the network-based service.
Figure 5:
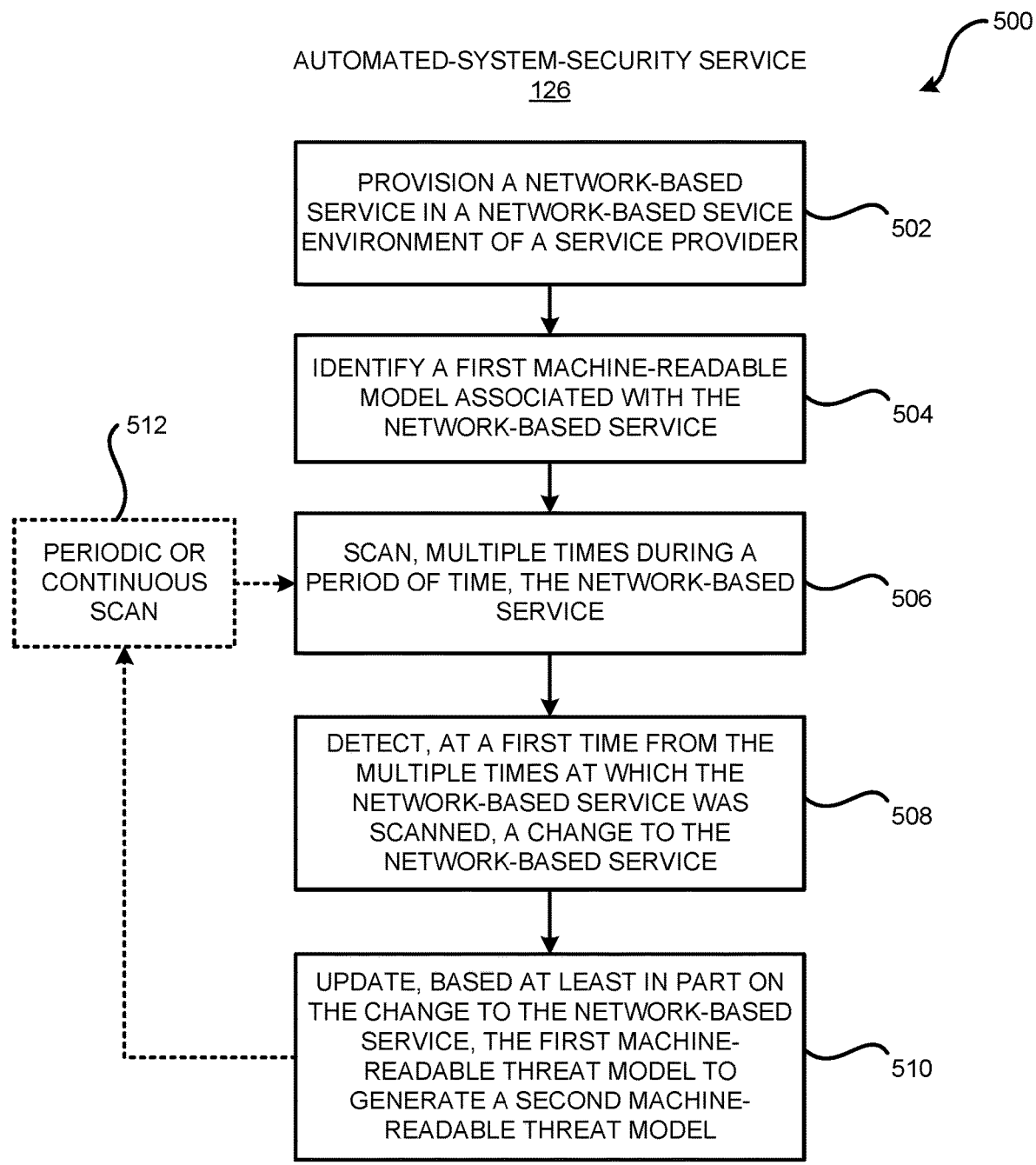
FIG. 5 illustrates a flow diagram of an example method, performed at least partly by an automated-system-security service, for utilizing a machine-readable threat model to identify system-level security threats to a network-based service.
Figure 6:
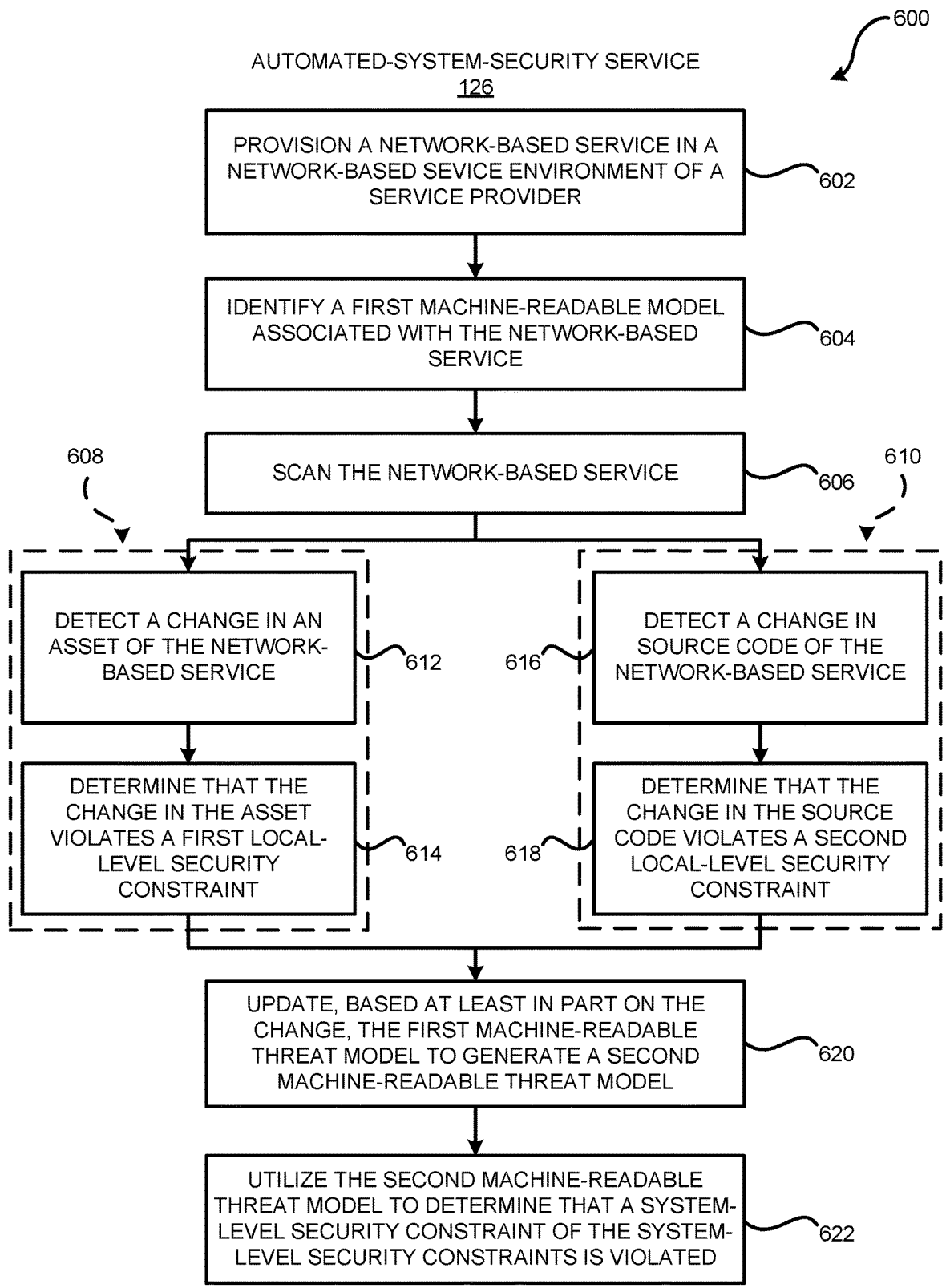
FIG. 6 illustrates a flow diagram of an example method for detecting changes in a network-based service, updating a machine-readable threat model based on the changes, and identifying system-level security threats to the network-based service utilizing the machine-readable threat model.

FIGS. 4-6 illustrate flow diagrams of example methods 400, 500, and 600 that illustrate aspects of the functions performed at least partly by the automated-system-security service 126 as described in FIGS. 1-3. The logical operations described herein with respect to FIGS. 4, 5, and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-6 and described herein. These operations can also be performed in parallel, or in a different order than those described herein. Some or all of these operations can also be performed by components other than those specifically identified.

FIG. 4 illustrates a flow diagram of an example method 400, performed at least partly by an automated-system-security service 126, for utilizing a machine-readable threat model 106 to identify system-level security threats 132 to a network-based service 102 caused by changes in the network-based service 102.

At 402, the service-provider network 104 may receive a request (e.g., input 112) to provision a network-based service 102 from a developer computing device 110. At 404, the service-provider network 104 may provision the network-based service 102 in a network-based service environment 116 of a service provider. In some examples, the network-based service 102 includes a first component 118A configured to perform first functionality of the network-based service 102, and a second component 118B configured to perform second functionality of the network-based service 102.

At 406, the automated-system-security service 126 may analyze the network-based service 102 to identify system-level security threats 132 to the network-based service 102. For instance, the scanning component 128 may, upon provisioning of the network-based service 102, scan the network-based service 102 to identify system-level security threats 132 to the network-based service 102.

At 408, the automated-system-security service 126 may generate a first machine-readable threat model 106 that represents system-level security constraints 132 for the network-based service 102 to detect the corresponding system-level security threats 132.

At 410, the automated-system-security service 126 may detect a change to the network-based service 102 that affects the first component 118A. For example, the security configuration analysis engine 210 may detect a change to the assets 120 of the first component 118A, and/or the source-code analysis engine 212 may detect a change to the source code 122 of the first component 118A.

At 412, the automated-system-security service 126 may determine that the change violates a local-level security constraint 124 associated with the first component 118A of the network-based service 102. In various examples, the automated-system-security service 126 may first determine, at 412, that the change violates the local-level security constraint 124 of a component before analyzing the system-level security constraints 132. However, in other examples, the automated-system-security service 126 may not determine whether the change violates the local-level security constraint 124, and may simply move onto determining whether the change violates the system-level security constraint 132.

At 414, the automated-system-security service 126 may update, based at least in part on the change, the first machine-readable threat model 106 to generate a second machine-readable threat model 106. For instance, the security-configuration analysis engine 210 may update a representation of the assets 120 of the first component 118A included in the machine-readable threat model 202, and/or the source-code analysis engine 212 may update a representation of the source code 122 of the first component 118A included in the machine-readable threat model 202. In this way, an updated machine-readable threat model 202 may be generated that represents the change made to the network-based service 102.

At 416, the automated-system-security service 126 may utilize the second machine-readable threat model to determine that a system-level security constraint 132 of the system-level security constraints 132 is violated. For instance, the threat-analysis framework 214 may determine that the system-level security constraint 132 is violated by the updated machine-readable threat model 202 due to the change in the network-based service 102.

In some examples, the system-level security constraint is defined based at least in part on a first security property for a boundary of the network-based service at which behavior of the network-based service is observable by a user of the network-based service. Further, in some examples, the local-level security constraint is defined based at least in part on a second security property for the first component of the network-based service that is internal to the boundary at which the behavior of the network-based service is observable by the user.

At 418, the automated-system-security service 126 may provide a notification 154 that the system-level security constraint 132 was violated to a security computing device 144 associated with the service provider 104.

In some examples, the method 400 may further include the automated-system-security service 126 scanning, at a time subsequent to detecting the change to the network-based service 102, the first component and the second component multiple times over a period of time to determine whether the first component or the second component underwent changes. The automated-system-security service 126 may detecting at a later time of the multiple times, another change to at least one of the first component or the second component. The automated-system-security service 126 may update, based at least in part on the other change, the second machine-readable threat model to generate a third machine-readable threat model, and utilize the third machine-readable threat model to determine that another system-level security constraint of the system-level security constraints is violated.

FIG. 5 illustrates a flow diagram of an example method 500, performed at least partly by an automated-system-security service 126, for utilizing a machine-readable threat model 106 to identify system-level security threats 132 to a network-based service 102.

At 502, the service-provider network 104 may provision a network-based service 102 in a network-based service environment 106 of a service provider. The network-based service 102 may comprise one or more components 118 associated with one or more local-level security constraints 124 to identify one or more local-level threats 124 to the one or more components 118.

At 504, the automated-system-security service 126 may identify a first machine-readable threat model 106 associated with the network-based service 102. In some examples, the first machine-readable threat model 106 may comprise a representation of the network-based service 106 and a system-level security constraint 132 to identify a corresponding system-level threat 132 to the network-based service 102. In some examples, identifying the first machine-readable threat model 106 associated with the network-based service 102 may comprise generating the first machine-readable threat model 106 based at least in part on an initial analysis of the network-based service 102 provisioned in the network-based service environment 116. In various examples, identifying the first machine-readable threat model 106 associated with the network-based service 102 may comprise selecting, from a data structure 156 storing a plurality of machine-readable threat models 164, the first machine-readable threat model 106 associated with the network-based service 102.

At 506, the automated-system-security service 126 may scan, multiple times during a period of time, the network-based service 102. At 508, the automated-system-security service 126 may detect, at a first time from the multiple times at which the network-based service 102 was scanned, a change to the network-based service 102.

At 510, the automated-system-security service 126 may update, based at least in part on the change to the network-based service 102, the first machine-readable threat model 106 to generate a second machine-readable threat model 106.

In various examples, at 512, the automated-system-security service 126 may continue to periodically or continuously scan the network-based service 506 to detect changes, and proceed through steps 506-510.

In some examples, the method 500 may further include the automated-system-security service 126 utilizing the second machine-readable threat model 106 to determine that the change to the network-based service 102 violates the system-level security constraint 132 such that the network-based service 102 is exposed to the corresponding system-level threat 132. In such examples, the automated-system-security service 126 may further perform at least one of providing a notification that the system-level security constraint 132 was violated to a security computing device 144 associated with the service provider, providing an indication of a mitigation 134 to remedy the system-level threat 132 to the security computing device 144, or automatically performing the mitigation 134 to the network-based service 102 to remedy the system-level threat 132. The automated-system-security service 126 may further determine that the mitigation 134 performed on the network-based service 102 remedies the system-level threat 132.

In some examples, the automated-system-security service 126 may utilize the second machine-readable threat model 106 to determine that the change to the network-based service 102 violates the system-level security constraint 132 such that the network-based service is exposed to the system-level threat, and further determine a severity of the system-level threat 132 to the network-based service 102. Based at least in part on the severity of the system-level threat, the automated-system-security service 126 may provide a notification 144 that the system-level security constraint 132 was violated to a security computing device 144 associated with the service provider.

FIG. 6 illustrates a flow diagram of an example method 600 for detecting changes in a network-based service 102, updating a machine-readable threat model 106 based on the changes, and identifying system-level security threats 132 to the network-based service 102 utilizing the machine-readable threat model 106.

At 602, the service-provider network 104 may provision a network-based service 102 in a network-based service environment 106 of a service provider. The network-based service 102 may comprise one or more components 118 associated with one or more local-level security constraints 124 to identify one or more local-level threats 124 to the one or more components 118.

At 604, the automated-system-security service 126 may identify a first machine-readable threat model 106 associated with the network-based service 102. In some examples, the first machine-readable threat model 106 may comprise a representation of the network-based service 106 and a system-level security constraint 132 to identify a corresponding system-level threat 132 to the network-based service 102. In some examples, identifying the first machine-readable threat model 106 associated with the network-based service 102 may comprise generating the first machine-readable threat model 106 based at least in part on an initial analysis of the network-based service 102 provisioned in the network-based service environment 116. In various examples, identifying the first machine-readable threat model 106 associated with the network-based service 102 may comprise selecting, from a data structure 156 storing a plurality of machine-readable threat models 164, the first machine-readable threat model 106 associated with the network-based service 102.

At 606, the automated-system-security service 126 may scan the network-based service 102. In various examples, the method 600 may proceed through branch 608, through branch 610, or through both branches depending on results of the scan of the network-based service 102.

For instance, the method 600 may proceed through branch 608 if the security-configuration analysis engine 210 detects, at 612, a change in an asset 120 of the network-based service 102. In such examples, the automated-system-security service 126 may further determine, at 614, that the change in the asset 120 violates a first local-level security constraint 124 associated with the asset 120.

In some examples, the method 600 may additionally or alternatively proceed through branch 610 if the source-code analysis engine 212 detects, at 616, a change in the source code 122 of the network-based service 102. In such examples, the automated-system-security service 126 may further determine, at 618, that the change in the source code 122 violates a second local-level security constraint 124 associated with the source code 122.

In various examples, other types of changes may be detected in addition to, or in lieu of, the changes detected in branches 608 and 610. For instance, changes to control policies between assets 120 and/or components 118 may be detected. However, any other type of change to the network-based service 102 that may cause a violation of a system-level security constraint 132 may be detected and utilized at 620 to update the first machine-readable threat model 106.

At 620, the automated-system-security service 126 may update, based at least in part on the change detected in the 608 branch, the change detected in the 610 branch, or both, the first machine-readable threat model 106 to generate a second machine-readable threat model 106. For instance, the security-configuration analysis engine 210 may update a representation of the assets 120 of the first component 118A included in the machine-readable threat model 202, and/or the source-code analysis engine 212 may update a representation of the source code 122 of the first component 118A included in the machine-readable threat model 202. In this way, an updated machine-readable threat model 202 may be generated that represents the change made to the network-based service 102.

At 622, the automated-system-security service 126 may utilize the second machine-readable threat model to determine that a system-level security constraint 132 of the system-level security constraints 132 is violated. For instance, the threat-analysis framework 214 may determine that the system-level security constraint 132 is violated by the updated machine-readable threat model 202 due to the change in the network-based service 102.

Figure 7:
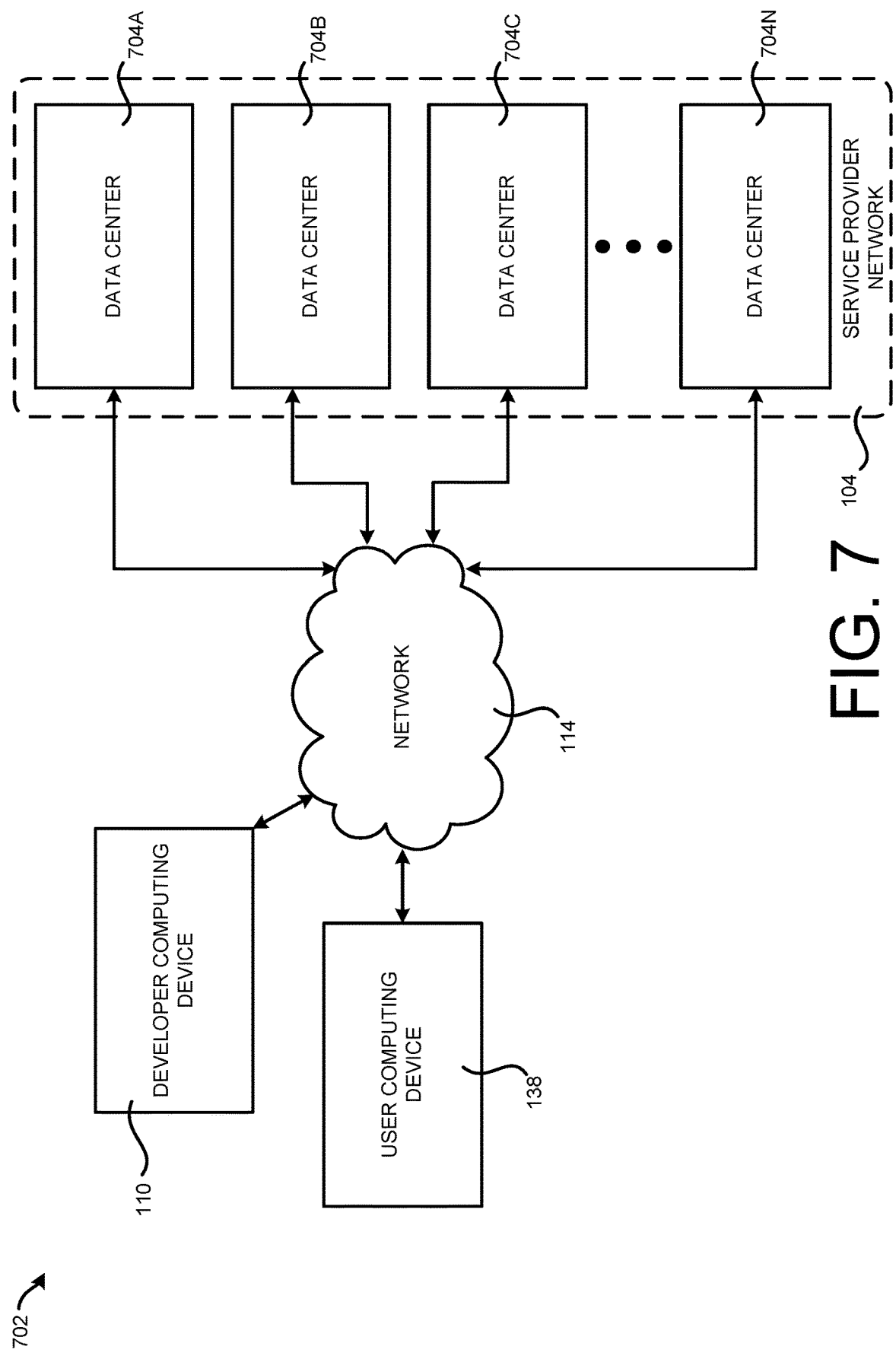
FIG. 7 is a system and network diagram that shows an illustrative operating environment that includes a service provider network that can be configured to implement aspects of the functionality described herein.

FIG. 7 is a system and network diagram that shows one illustrative operating environment 702 for the configurations disclosed herein that includes a service-provider network 104 that can be configured to provide the automated-system-security service 126 disclosed herein. The service-provider network 104 can provide computing resources, like VM instances and storage, on a permanent or an as-needed basis. Among other types of functionality, the computing resources provided by the service-provider network 104 may be utilized to implement the various services described above. As also discussed above, the computing resources provided by the service-provider network 104 can include various types of computing resources, such as data processing resources like VM instances, data storage resources, networking resources, data communication resources, network services, and the like.

Each type of computing resource provided by the service-provider network 104 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 104 can also be configured to provide other types of computing resources not mentioned specifically herein.

The computing resources provided by the service-provider network 104 may be enabled in one embodiment by one or more data centers 704A-704N (which might be referred to herein singularly as "a data center 804" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The customers and other users of the service-provider network 104 may access the computing resources provided by the service-provider network 104 over a network 114, which can be a wide area communication network ("WAN"), such as the Internet, an intranet or an Internet service provider ("ISP") network or a combination of such networks. For example, and without limitation, a computing device 138 operated by a customer or other user of the service-provider network 104 may be utilized to access the service-provider network 104 by way of the network 114. It should be appreciated that a local-area network ("LAN"), the Internet, or any other networking topology known in the art that connects the data centers 704 to remote customers and other users can be utilized. It should also be appreciated that combinations of such networks can also be utilized.

Figure 8:
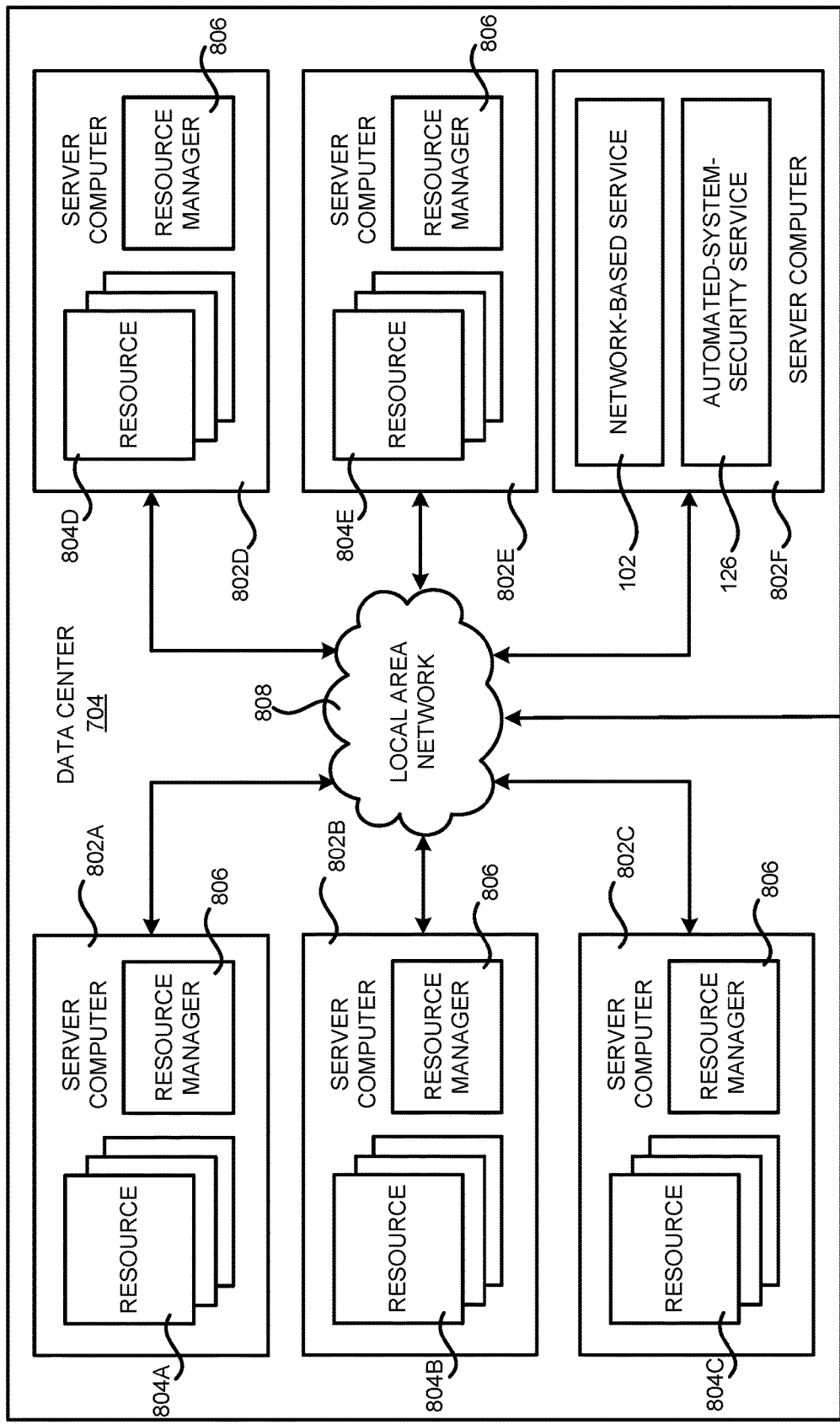
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein for providing the automated-system-security service 126. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rackmount, or blade server computers configured appropriately for providing the computing resources described herein (illustrated in FIG. 8 as the computing resources 804A-804E). As mentioned above, the computing resources provided by the service-provider network 104 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute the network-based service 102, the automated-system-security service 126, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 804 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the data centers 704. It should be appreciated that the configuration of the data center 704 described with reference to FIG. 8 is merely illustrative and that other implementations can be utilized.

Figure 9:
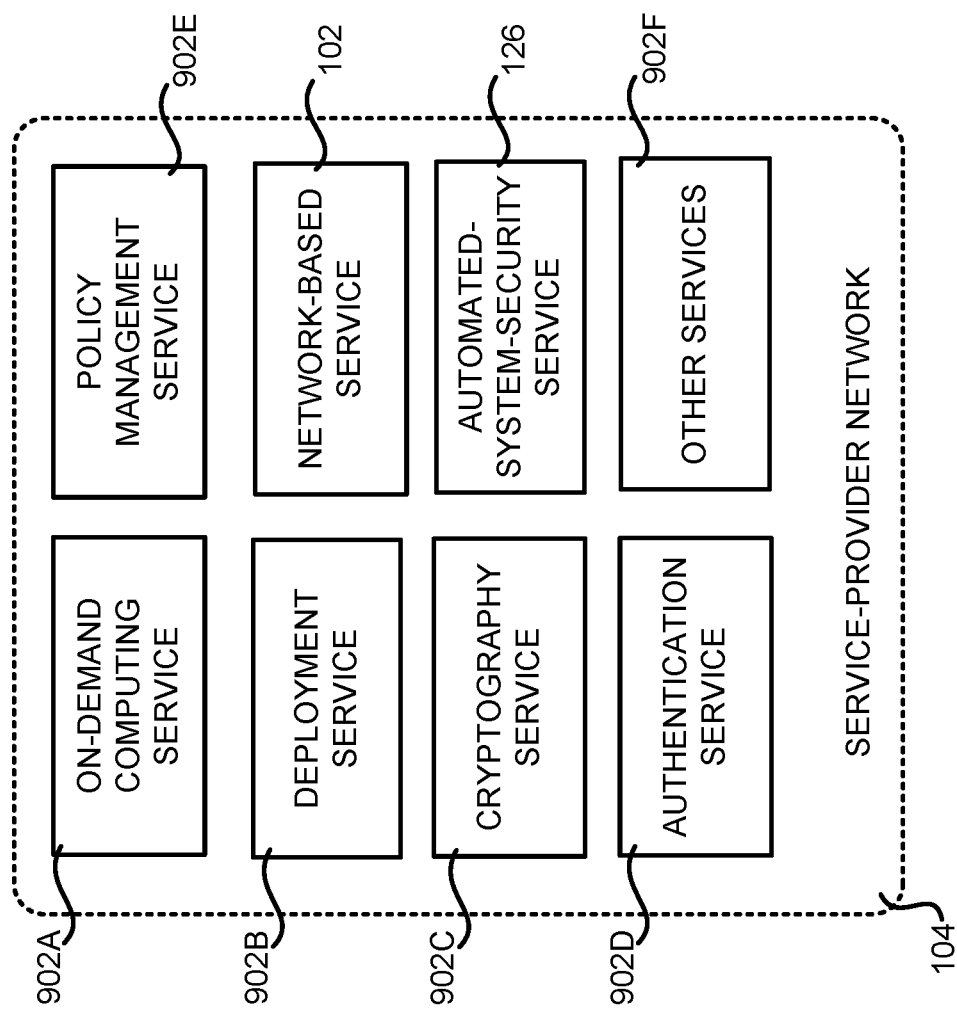
FIG. 9 is a system and network diagram that shows aspects of several services that can be provided by and utilized within a service provider network in one configuration disclosed herein.

FIG. 9 is a system and network diagram that shows aspects of several network services that can be provided by and utilized within a service-provider network 104 in one embodiment disclosed herein. In particular, and as discussed above, the service-provider network 104 can provide a variety of network services to customers and other users of the service-provider network 104 including, but not limited to, the network-based service 102 and the automated-system-security service 126. The service-provider network 104 can also provide other types of services including, but not limited to, an on-demand computing service 902A, a deployment service 902B, a cryptography service 902C, an authentication service 902D, and/or a policy management service 902E, some of which are described in greater detail below. Additionally, the service-provider network 104 can also provide other services 902F, some of which are also described in greater detail below.

It should be appreciated that customers of the service-provider network 104 can include organizations or individuals that utilize some or all of the services provided by the service-provider network 104. As described herein, a customer or other user can communicate with the service-provider network 104 through a network, such as the network 114 shown in FIG. 7. Communications from a customer computing device, such as the computing devices 110 and 138 shown in FIG. 7, to the service-provider network 104 can cause the services provided by the service-provider network 104 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A can be a collection of computing resources configured to instantiate VM instances and to provide other types of computing resources on demand. For example, a customer or other user of the service-provider network 104 can interact with the on-demand computing service 902A (via appropriately configured and authenticated network services API calls) to provision and operate VM instances that are instantiated on physical computing devices hosted and operated by the service-provider network 104.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service-provider network 104, such as a computer system or computer system service that does not employ virtualization and instead provisions computing resources on dedicated or shared computers/servers and/or other physical devices.

A storage service (e.g., other services 902F) can include software and computing resources that collectively operate to store data using block or file-level storage devices (and/or virtualizations thereof). The storage devices of the storage service 902F can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The service-provider network 104 can also include a cryptography service 902C. The cryptography service 902C can utilize storage services of the service-provider network 104, such as the storage service 902F, to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service-provider network 104, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service-provider network 104 can additionally maintain other services 902F based, at least in part, on the needs of its customers. For instance, the service provider network 102 can maintain a deployment service 902B for deploying program code and/or a data warehouse service in some embodiments. Other services include object-level archival data storage services, database services, and services that manage, monitor, interact with, or support other services. The service-provider network 104 can also be configured with other services not specifically mentioned herein in other embodiments.

Figure 10:
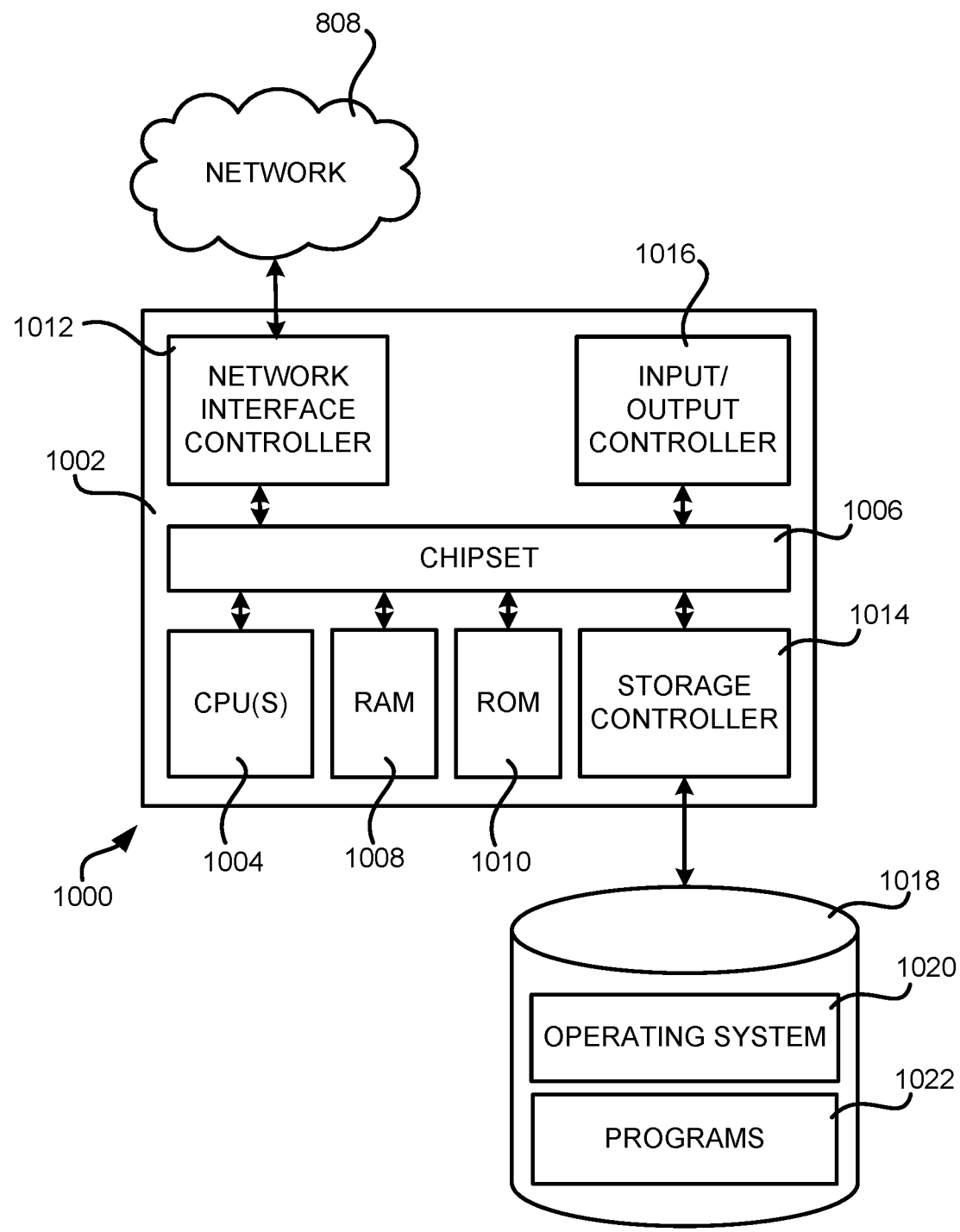
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 808. The chipset 1006 can include functionality for providing network connectivity through a NIC 1012, such as a gigabit Ethernet adapter. The NIC 1012 is capable of connecting the computer 1000 to other computing devices over the network 808 (or 114). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   allocating resources of a cloud platform to a private computing environment of a user account of the cloud platform, wherein the private computing environment includes:
      a first component configured to perform first functionality of a service of the user account; and
      a second component configured to perform second functionality of the service; and
   receiving, from the user account, definitions of rules for preventing unsecure configurations of the resources;
   receiving, from the user account, an indication that the rules are to be applied to the first component;
   applying the rules against configurations of a set of the resources supporting the first component in the private computing environment associated with the user account;
   scanning the resources to validate the configurations of the resources as being compliant with the rules;
   determining, based at least in part on the scanning, that a particular resource has an unsecure configuration that is noncompliant with the rules; and
   providing the user account with access to an indication of the unsecure configuration of the particular resource that is noncompliant.

2. The method of claim 1, further comprising:
   deploying a software module on infrastructure that has access to the resources; and
   sending a signal to the software module to initiate the scanning of the resources.

3. The method of claim 1, further comprising:
   receiving, from the user account, a schedule according to which to run scans; and
   determining to scan the resources based at least in part on a time in the schedule.

4. The method of claim 1, further comprising:
   providing the user account with access to another indication of a remediation for the unsecure configuration;
   receiving input from the user account indicating a request to implement the remediation; and
   implementing the remediation to remediate the unsecure configuration.

5. The method of claim 1, further comprising:
   identifying a remediation for the unsecure configuration; and
   automatically implementing the remediation to remediate the unsecure configuration.

6. The method of claim 1, further comprising:
   evaluating the rules against the configurations of the resources; and
   calculating a compliance score indicating compliance of the configurations with the rules based at least in part on the evaluating.

7. A system comprising:
   one or more processors; and
   one or more computer-readable media storing computer-executable instructions that, when executed by the one or more processors, cause the one or more processors to perform operations comprising:

running services on behalf of a user account in a hosted environment of a cloud infrastructure, wherein the services include:
- a first service configured to perform first functionality; and
- a second service configured to perform second functionality;

logging events performed against the first and second services in an event log;

monitoring the event log using a machine-learning (ML) attack model that is trained to identify security problems in the first service;

identifying, based at least in part on the monitoring, a security problem in the first service; and providing the user account with access to an indication of the security problem.

8. The system of claim 7, the operations further comprising providing the user account with access to a recommendation for remediating the security problem.

9. The system of claim 7, the operations further comprising automatically remediating the security problem.

10. The system of claim 7, the operations further comprising:
- receiving input from the user account indicating a remediation to the security problem; and
- applying the remediation to the first service to remedy the security problem.

11. The system of claim 7, the operations further comprising:
- identifying a set of security problems associated with the first service;
- determining criticalities for the set of security problems; and
- providing the user account with indications of the set of security problems based at least in part on the criticalities.

12. The system of claim 7, the operations further comprising assigning an overall confidence score indicating a potential maliciousness associated with the security problem.

13. The system of claim 7, further comprising a threat detector service that performs at least the monitoring of the event log and the identifying of the security problem.

14. A method comprising:
running services on behalf of a user account in a hosted environment of a cloud infrastructure, wherein the services include:
- a first service configured to perform first functionality; and
- a second service configured to perform second functionality;

logging events performed against the first and second services in an event log;

monitoring the event log using a machine-learning (ML) attack model that is trained to identify security problems in the first and second services;

identifying, based at least in part on the monitoring, a security problem in the first service; and providing the user account with access to an indication of the security problem.

15. The method of claim 14, further comprising providing the user account with access to a recommendation for remediating the security problem.

16. The method of claim 14, further comprising automatically remediating the security problem.

17. The method of claim 14, further comprising:
- receiving input from the user account indicating a remediation to the security problem; and
- applying the remediation to the first service to remedy the security problem.

18. The method of claim 14, further comprising:
- identifying a set of security problems associated with the first service;
- determining criticalities for the set of security problems; and
- providing the user account with indications of the set of security problems based at least in part on the criticalities.

19. The method of claim 14, further comprising assigning an overall confidence score indicating a potential maliciousness associated with the security problem.

20. The method of claim 14, wherein the monitoring the event log to identify security problems in the first service includes using a machine-learning (ML) attack model that is trained to identify the security problems.

* * * * *